UNITED STATES PATENT OFFICE.

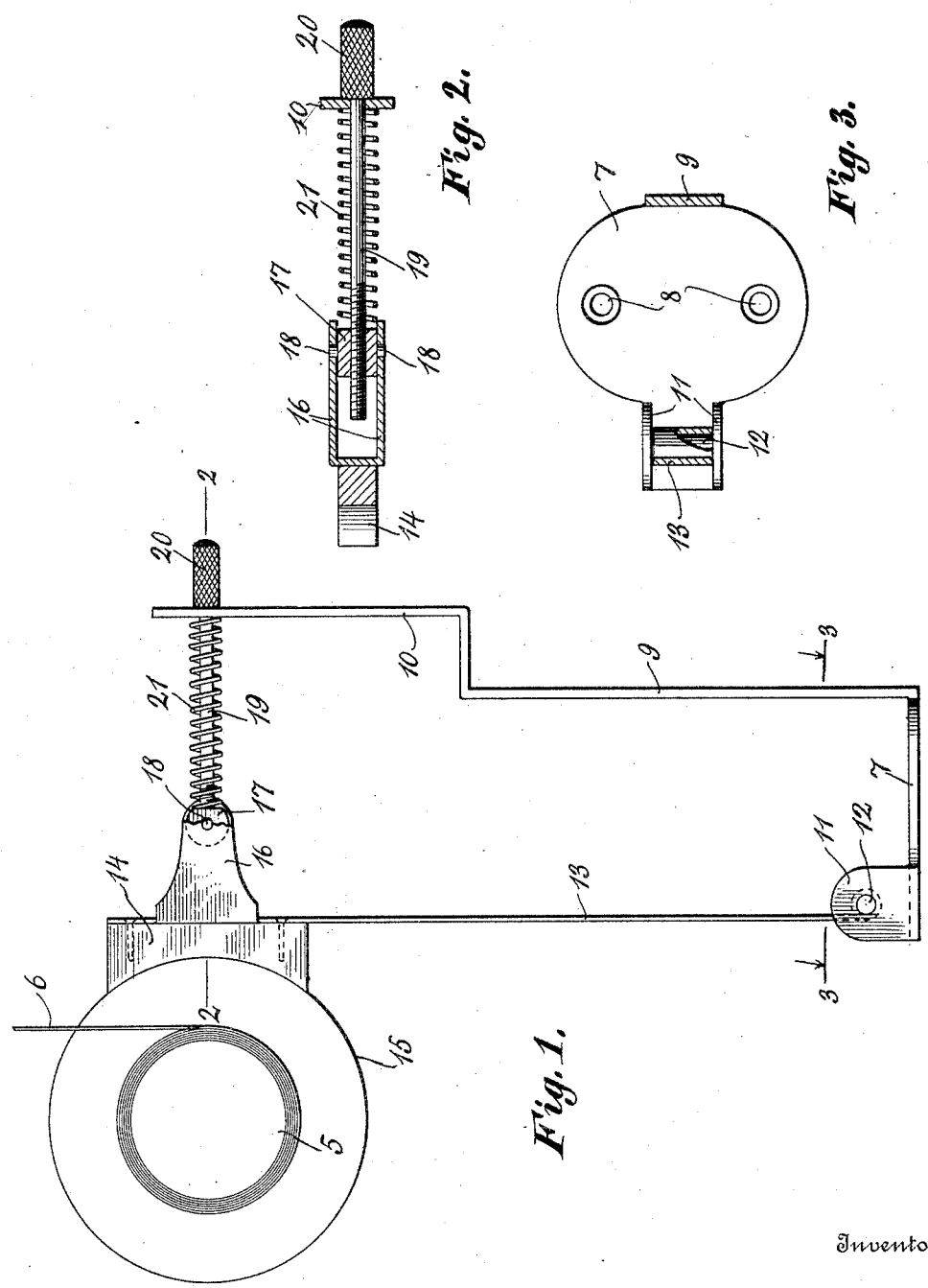

LOUIS RUSSEL KILLINGSWORTH, OF SALT LAKE CITY, UTAH.

BRAKE MECHANISM.

1,068,248.     Specification of Letters Patent.     Patented July 22, 1913.

Application filed May 7, 1912. Serial No. 695,710.

*To all whom it may concern:*

Be it known that I, LOUIS R. KILLINGSWORTH, a citizen of the United States, residing at Salt Lake City, in the county of Salt Lake and State of Utah, have invented certain new and useful Improvements in Brake Mechanism, of which the following is a specification.

This invention relates to improvements in the control of the take-up roller of mechanically operated musical instruments, and its object is to provide a simple and highly efficient brake mechanism, whereby a perfect and automatic control of the take-up roller is effected.

With the herein stated object in view, the invention consists in a novel construction and arrangement of parts to be hereinafter described and claimed, reference being had to the accompanying drawing forming a part of this specification, in which drawing, Figure 1 is a side elevation of the device. Fig. 2 is a section on the line 2—2, and Fig. 3 is a section on the line 3—3 of Fig. 1.

Referring specifically to the drawing, 5 denotes the take-up roller of a pianola or other player piano or mechanism, from which the music sheet 6 is unwound after having been wound thereon. This roller is provided with a brake mechanism which is the subject of the present invention, and which will now be described in detail.

At 7 is indicated a base plate which is secured in any suitable manner to some convenient portion of the frame of the player mechanism, the location depending on the structure of the mechanism. It may be here stated that the invention is not limited to any particular make of player mechanism, but it may be applied to any one of such mechanisms in use. The base plate has perforations 8 to receive screws or other suitable fastening means whereby it is mounted in place.

At one end of the base plate 7 is an upstanding bracket arm 9 having its upper end offset as indicated at 10. At the other end of the base plate are spaced upstanding ears 11 between which is pivoted, by means of a transverse pin 12, the lower extremity of a lever 13 carrying at its other extremity a brake-shoe 14 which is suitably shaped so that it may engage the periphery of a flange 15 on the roller 5. From the back of the lever 13, at the upper end thereof, and behind the shoe 14, extend laterally spaced ears 16 between which is mounted a nut 17 having trunnions 18 on opposite sides which seat in bearing apertures in the ears, whereby the nut is free to rock. Into the nut 17 is screwed the threaded end of a stem 19, the other end of which passes loosely through an aperture in the offset 10 of the bracket arm 9, and is enlarged to form a thumbpiece 20 which is knurled to facilitate the operation of the stem. The nut is flattened on one side to form a seat for one end of a spring 21, which is coiled around the stem 19, and abuts at its other end against the offset 10.

The bracket arm 9 is rigid, by reason of which it will be evident that the brake-shoe 14 may be adjusted toward and from the flange 15 by rotating the screw-stem 19. Rotation of the screw-stem causes the nut 17 to be advanced or retracted, whereby the lever 13 is swung on its pivot to increase or decrease the proximity of the brake-shoe to the flange 15 and thereby regulating the degree of friction therebetween. As the nut is swiveled, the parts work free and there is no tendency to binding. The lever is flexible which reduces rigidity in operation to a minimum. By rotating the stem in one direction, the shoe is drawn away from the flange, and when the stem is rotated in the opposite direction, the shoe is forced toward the flange. The spring 21 is at all times forcing the lever 13 and the parts carried thereby in the direction of the flange 15 to the limit allowed by the desired length of the stem 19 between the nut 17 and the part 20, which latter forms a shoulder engaging the bracket-arm 9 and limiting the forward movement of the stem. The nut allows absolute free movement of the stem regardless of the relative position of the lever 13 and the bracket arm 9 due either to the turning of the stem or the constant vibration of the lever and the parts carried thereby when the device is in operation. There is also absolute free movement of the lever and the parts carried thereby, and consequently a minimum of friction between the brake-shoe and the flange of the take-up roller when the device is operating and vibrating.

The device is very simple in construction and can be cheaply produced. The parts 7, 9, 10, and 11 may be stamped from a single piece of metal and bent to the desired position. The parts 13 and 16 may be formed in a similar manner.

I claim:

1. In a brake mechanism, a pivoted lever carrying a brake-shoe and a swiveled nut, a bracket-arm, a stem passing loosely through the bracket-arm and having at one end a shoulder engageable therewith, the other end of the stem being threaded through the aforesaid nut to permit longitudinal adjustment, and a spring for forcing the lever in a direction to apply the brake-shoe, the aforesaid shoulder limiting the movement of the lever in the direction to apply the brake-shoe.

2. In a brake mechanism, a bracket-arm, a pivoted lever carrying a brake-shoe, spaced ears extending from the lever, a nut mounted between the ears and having transverse trunnions on opposite sides which are journaled in the ears, a stem threaded lengthwise through the nut to permit longitudinal adjustment, said stem passing loosely through the aforesaid bracket-arm and having a shoulder engaging said arm, and a spring abutting at one end against the aforesaid nut and at its other end against the bracket-arm for forcing the lever in a direction to apply the brake-shoe, the aforesaid shoulder limiting the movement of the stem in the direction to apply the brake.

In testimony whereof I affix my signature in presence of two witnesses.

LOUIS RUSSEL KILLINGSWORTH.

Witnesses:
 HAM. P. POLL,
 WM. H. ALEXANDER.

Copies of this patent may be obtained for five cents each, by addressing the "Commissioner of Patents, Washington, D. C."